(12) United States Patent
Kiridena et al.

(10) Patent No.: US 6,917,693 B1
(45) Date of Patent: Jul. 12, 2005

(54) VEHICLE DATA ACQUISITION AND DISPLAY ASSEMBLY

(75) Inventors: Vijitha Senaka Kiridena, Ann Arbor, MI (US); Gregory Hugh Smith, Ann Arbor, MI (US); Samuel Edward Ebenstein, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/467,818

(22) Filed: Dec. 20, 1999

(51) Int. Cl.$^7$ .............................. G06K 9/00; G06K 9/36; G01C 21/26
(52) U.S. Cl. ........................ 382/104; 382/284; 701/223
(58) Field of Search .............................. 382/104, 103, 382/154, 284; 701/200, 223, 210, 211, 117–119; 345/173–178; 340/435, 436, 937; 348/148

(56) References Cited

U.S. PATENT DOCUMENTS

| | | | | |
|---|---|---|---|---|
| 3,915,385 A | * | 10/1975 | Hassinger | 239/284.2 |
| 4,404,059 A | | 9/1983 | Livshits et al. | |
| 5,027,104 A | * | 6/1991 | Reid | 340/426 |
| 5,140,719 A | * | 8/1992 | Cowan | 15/250.001 |
| 5,546,630 A | * | 8/1996 | Long | 15/250.002 |
| 5,649,032 A | | 7/1997 | Burt et al. | |
| 5,657,073 A | * | 8/1997 | Henley | 348/38 |
| 5,680,123 A | * | 10/1997 | Lee | 340/435 |
| 5,686,957 A | * | 11/1997 | Baker | 348/36 |
| 5,793,308 A | * | 8/1998 | Rosinski et al. | 340/903 |
| 5,949,331 A | * | 9/1999 | Schofield et al. | 340/461 |
| 6,157,342 A | * | 12/2000 | Okude et al. | 340/995 |
| 6,161,066 A | * | 12/2000 | Wright et al. | 340/468 |
| 6,172,601 B1 | * | 1/2001 | Wada et al. | 340/435 |
| 6,184,781 B1 | * | 2/2001 | Ramakesavan | 340/435 |
| 6,281,649 B1 | * | 8/2001 | Ouellette et al. | 15/250.12 |
| 6,429,789 B1 | * | 8/2002 | Kiridena et al. | 340/905 |

FOREIGN PATENT DOCUMENTS

| | | | | |
|---|---|---|---|---|
| GB | 2142502 A | * | 1/1985 | H04N/5/76 |
| JP | 03099952 | | 4/1991 | |
| JP | 05310078 | | 11/1993 | |
| JP | 06227315 | | 8/1994 | |
| JP | 06344828 | | 12/1994 | |
| JP | 07144578 | | 6/1995 | |
| JP | 07195978 | | 8/1995 | |
| JP | 09030327 | | 2/1997 | |
| JP | 09118178 | | 5/1997 | |
| JP | 10104765 | | 4/1998 | |
| JP | 10175482 | | 6/1998 | |
| JP | 10211849 | | 8/1998 | |
| JP | 10257482 | | 9/1998 | |
| JP | 102586682 | | 9/1998 | |

OTHER PUBLICATIONS

Richard Szeliski, Video Masaics for Virtual Environments, Magazine, Mar. 1996, p. 22–30, IEEE Computer Graphics and Applications.

Irani M; Anandan P; Bergen J; et al, Efficient Representations of Video Sequences and Their Applications, May 1996, pp. 327–351, Signal Processing Image Communications.

Zoghlami I; Faugeras O; Deriche R, Using Geometric Corners to Build a 2D Mosaic From a Set of Images, Jun. 1997, pp. 420–425, IEEE Computer Society Conference on Computer Vision and Pattern Recognition.

(Continued)

Primary Examiner—Mehrdad Dastouri (57) ABSTRACT

A vehicle data acquisition and display assembly 10 which includes several cameras 75 which selectively and cooperatively receive images 77 from the environment or the ambient environment 83 in which a vehicle 60 resides. The acquired images 77 form a panoramic mosaic 85, at least a portion of which is selectively displayed by a display assembly 45 within the vehicle 60.

19 Claims, 4 Drawing Sheets

OTHER PUBLICATIONS

Peleg S; Herman J, Panoramic Mosaics by Manifold Projection, Jun. 1997, pp. 338–343, IEEE Computer Society Conference on Computer Vision and Pattern Recognition.

Muller JR; Anandan P; Bergen JR, Adaptive–complexity Registration of Images, Jun. 1994, pp. 953–957, IEEE Computer Society Conference on Computer Vision and Pattern Recognition.

Swahney HS; Kumar R, True Multi–image Alignment and its Application to Mosaicing and Lens Distortion Correction, 1997, pp. 450–456, IEEE Computer Society Conference on Computer Vision and Pattern Recognition.

Makisara K; Sarjakoski T; Anderson K; et al, Geometrical Processing Methods for Digitized Video Images, Jun. 1991, pp. 2427–2430, Igarss ' 91 : Remote Sensing, Global Monitoring For Earth Management : 1991 International Geoscience and Remote Sensing Symposium, Helsinki University of Technology, ESPO, Finland.

Wei W; Gao Z; Hu S, New Algorithm of Image Registration In Image Fusion Based on Wavelet Decomosition, Nov. 1996, pp. 28–34, Proceedings of Spie, The International Society for Optical Engineering.

Irani M; Hsu S; Anandan P, Video Compression Using Mosaic Representations, Nov. 1995, pp. 529–552, Signal Processing Image Communications.

Sawhney H; Kumar R, True Multi–Image Alignment and Its Application to Mosaicing and Lens Distortion Correction, Mar. 1999, pp. 235–243, vol. 21.

Dani; Pankaj; Chaudhuri; Subhasis, Automated Assembling of Images: Image Montage Preparation, Aug. 1994, pp. 431–435, vol. 28.

Szeliski R, Image Mosaicing for Tele–reality Applications, Dec. 1994, pp. 44–53, IEEE Workshop on Applications of Computer Vision.

Hansen M; Anandan P; Dana K; et al, Real–time Scene Stabilization and Mosaic Construction, Dec. 1994, pp. 54–62, IEEE Workshop on Applications of Computer Vision.

Irani M; Anandan P; Hsu S, Mosaic Based Representations of Video Sequences and Their Applications, Jun. 1995, pp. 605–611, Fifth International Conference on Computer Vision.

Shum HY; Szeliski R, Construction and Refinement of Panoramic Mosaics, Jan. 1998, pp. 953–958, International Conference on Computer Vision.

Gumustekin S; Hall RW, Image Registration and mosaicking Using a Self–calibrating Camera, Oct. 1998, pp. 818–822, vol. 1, Proceedings, International Conference on Image Processing.

Marks RL; Rock SM; Lee MJ, Real–time Video Mosaicking of the Ocean Floor, Jul. 1995, pp. 29–241, vol. 20, IEEE Journal of Oceanic Engineering.

Kumar R; Hanson AR, Robust Estimation of Camera Location and Orientation From Noisy Data Having Outliers, Nov. 1989, pp. 52–60, Workshop on Inerpretation of 3D Scenes 1989.

Irani M; Anandan P, Robust Multi–sensor Image Alignment, Jan. 1998, pp. 959–965, International Conference on computer Vision.

Gumustekin S; Hall RW, Mosaic Image Generation on a Flattened Gaussian Sphere, Dec. 1996, pp. 50–55, IEEE Workshop on Applications of Computer Vision.

Fleischer SD; Wang HH; Rock SM; et al, Video Mosaicking Along Arbitrary Vehicle Paths, Jun. 1996, pp. 293–299, IEEE Symposium on Autonomous Underwater Vehicle Technology.

Anderson K, Finding Common Points From Digitized Video Images, Jun. 1991, pp. 2423–2425, vol. 4, Igarss '91 Remote Sensing, Global Monitoring For Earth Management : 1991 International Geoscience and Remote Sensing Symposium, Helsinki University of Technology, ESPO, Finland.

Burt PJ; Anandan P; Hanna K, Electronic From–end Processor for Active Vision, Nov. 1992, pp. 769–780, vol. 1825, Proceedings of Spie, The International Society for Optical Engineering.

Anandan P; Irani M; Kumar R; et al, Video as an Image Data Source: Efficient Representations and Applications, Oct. 1995, pp. 318–321, 1996 IEEE International Conference on Image Processing Proceedings (ICIP).

Afek Y; Brand A, Mosaicking of Orthorectified Aerial Image, Feb. 1998, pp. 115–125, vol. 64, Photogrammetric Engineering and Remote Sensing.

Szeliski R; Kang SB, Direct Methods for Visual Scene Reconstruction, Jun. 1995, pp. 26–33, IEEE Workshop on Representation of Visual Scenes.

Irani M; Rousso B; Peleg S, Computing Occluding and Transparent Motions, Feb. 1994, pp. 5–16, vol. 12, International Journal of Computer Vision.

Shum HY; Ikeuchi K; Reddy R, Virtual Reality Modeling From a Sequence of Range Images, Sep. 1994, pp. 703–710, vol. 1, Proceedings of the IEEE RSJ GI International Conference on Intelligent Robots and Systems.

Fleischer SD; Marks RL; Rock; et al, Improved Real–time Video Mosaicking of the Ocean Floor, Oct. 1995, pp. 1935–1944, vol. 3, Oceans –Conference–.

Burt PJ; Hansen M; Anandan P, Video Mosaic Displays, Apr. 1996, pp. 119–127, vol. 2736, Proceedings of Spie, The International Society for Optical Engineering.

Szeliski R; Shum HY, Creating Full View Panoramic Image Mosaics and Environment Maps, Aug. 1997, pp. 251–258, Computer Graphics.

* cited by examiner

VEHICLE DATA ACQUISITION AND DISPLAY ASSEMBLY

FIELD OF INVENTION

The present invention relates to a vehicle data acquisition and display assembly and more particularly, to an assembly which selectively acquires and displays image type data representing and/or associated with the environment or the ambient environment in which a vehicle resides.

BACKGROUND OF THE INVENTION

A typical or conventional vehicle includes one or more mirrors which cooperatively provide and/or allow certain visual images of the environment or ambient environment to be acquired and displayed. While these mirrors do provide some desired images, the arrangement has some drawbacks.

For example and without limitation, the mirrors of a vehicle do not provide a view of the entire environment surrounding the vehicle and therefore substantially prevents the driver and/or vehicle occupants from acquiring an uninterrupted view of the entire area surrounding the vehicle, which is referred to as the environment or the ambient environment. For example, the provided mirror assembly does not typically allow the driver or the vehicle occupants to view areas and/or regions and/or objects residing within and/or along the left and/or the right frontal portions of the vehicle, especially if the vehicle is travelling behind a relatively large truck or other type of relatively large vehicle, such as a sports utility vehicle. Furthermore, to gain additional environmental image information, drivers are required to undesirably turn or contort their heads, thereby being distracted from the task of driving the vehicle and being forced to "take their eyes off the road". Therefore, it may be desirable to increase the amount of provided environmental image information over that which is provided by the vehicle mirror assemblies and to allow a driver and/or occupants within a vehicle to selectively view the acquired visual or image information representing and/or associated with the environment in which the vehicle resides.

Consequently, there is a need to selectively acquire and display information which represents and/or is associated with the environment in which a vehicle resides, including but not limited to the areas and/or regions which cooperatively surround the vehicle, in a manner which overcomes at least some of the drawbacks associated with prior image acquisition techniques and assemblies.

SUMMARY OF THE INVENTION

It is a first object of the present invention to provide a data acquisition and display assembly which overcomes some or all of the drawbacks of prior vehicle data acquisition and display assemblies.

It is a second object of the present invention to provide a vehicle data acquisition and display assembly which allows a driver and/or occupant to selectively display certain portions, regions, and/or areas of the environment in which the vehicle resides.

It is a third object of the present invention to provide a vehicle data acquisition and display assembly which selectively provides relatively clean, clear, and "crisp" images of the environment in which the vehicle resides, to a driver of the vehicle and/or to other vehicle occupants.

It is a fourth object of the present invention to provide a vehicle data acquisition and display assembly which selectively displays a view of the environment in which the vehicle resides without requiring the head of the driver of the vehicle to be substantially turned and/or contorted.

According to a first aspect of the present invention, a vehicle data acquisition and display assembly for use with a vehicle which resides within an environment is provided. The assembly comprises at least one image acquisition apparatus which is disposed upon a vehicle and which acquires images of the environment in which the vehicle resides; a video processing assembly which is coupled to the at least one image acquisition apparatus, which receives the acquired images, and which uses the acquired images to create a mosaic image of the environment; a display which is coupled to the video processing assembly, which is disposed within the vehicle, and which selectively displays at least one portion of the mosaic; and an image control assembly which selects the at least one portion, thereby allowing the at least one portion to be selectively displayed by the display assembly.

According to a second aspect of the present invention, a method for acquiring and selectively displaying images to be viewed within a vehicle is provided. The method comprises the steps of providing a plurality of cameras; disposing the plurality of cameras upon the vehicle, effective to acquire the images; providing a display; disposing the display within the vehicle, effective to selectively display at least a portion of the plurality of images; generating a voice command; and using the voice command to select the at least a portion of the plurality of images for display.

These and other objects, aspects, and advantages of the present invention will become apparent upon reading the following detailed description of the preferred embodiment of the invention in combination with the accompanying drawings.

DETAILED DESCRIPTION OF THE PREFERRED EMBODIMENT OF THE INVENTION

Figure 1:
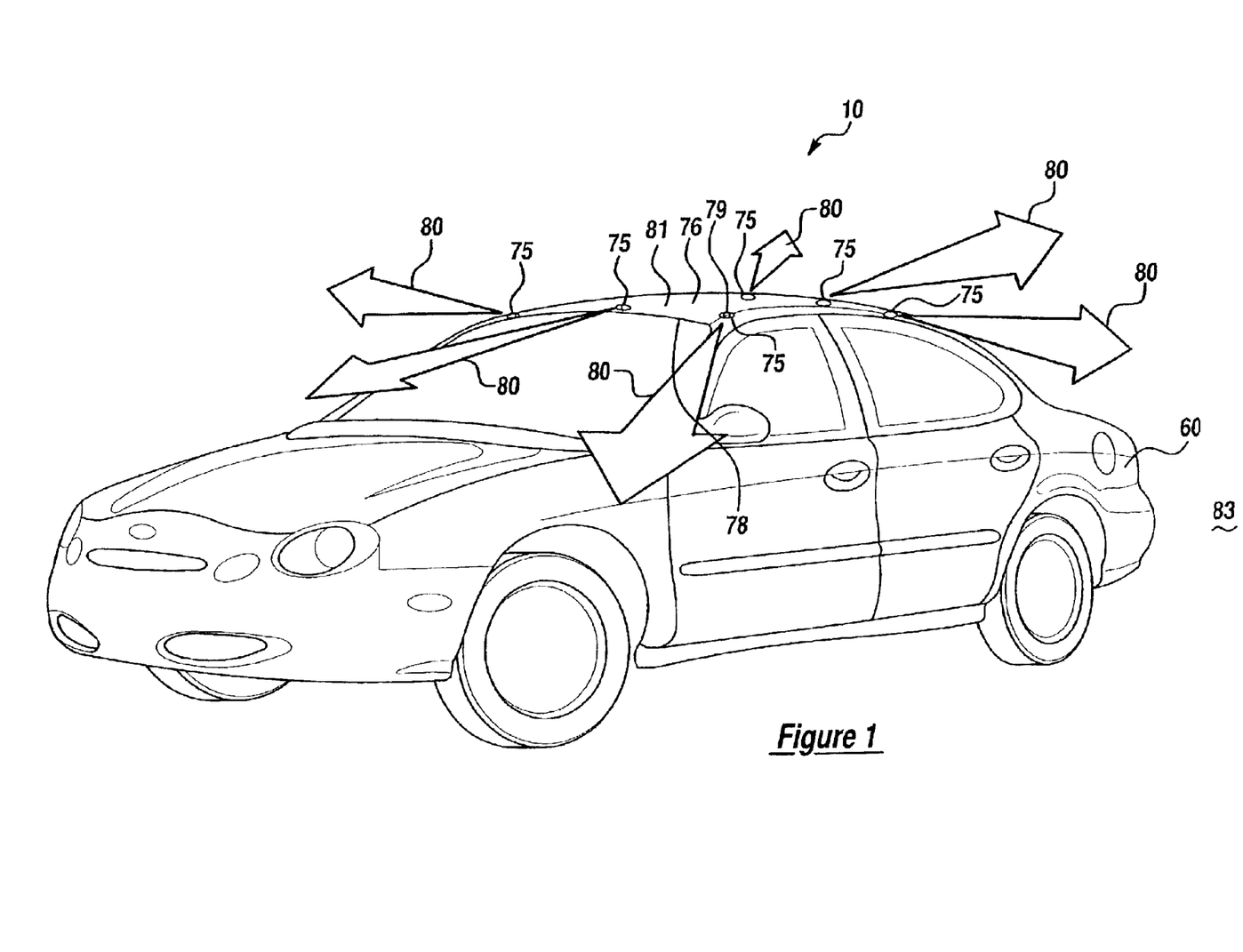
FIG. 1 is a perspective view of a vehicle having and/or employing a data acquisition and display assembly which is made in accordance with the teachings of the preferred embodiment of the invention.
Figure 3:
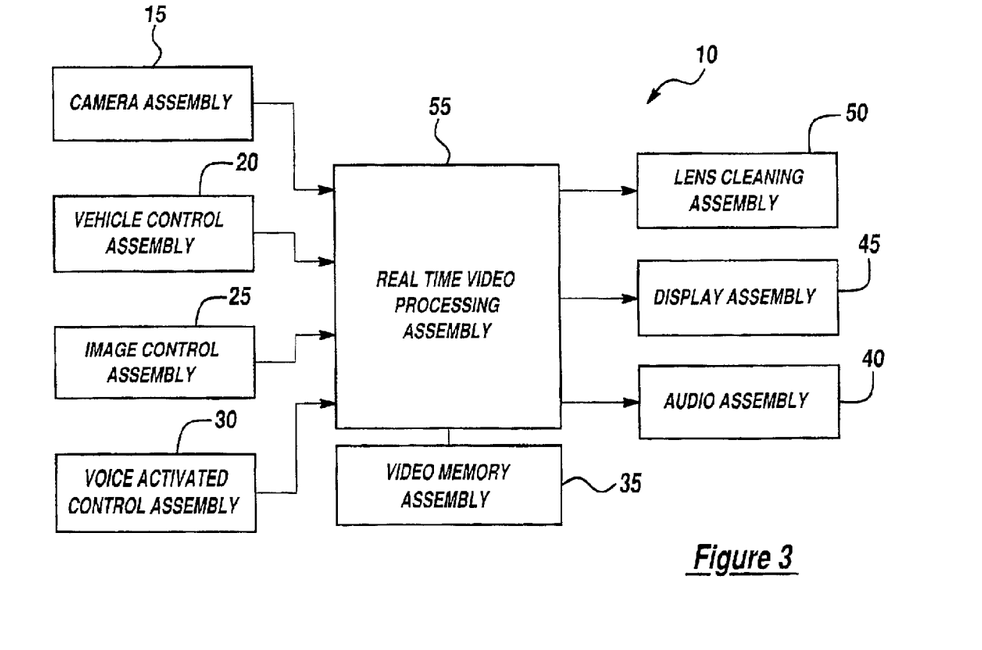
FIG. 3 is a block diagram of the data acquisition and display assembly which is made in accordance with the teachings of the preferred embodiment of the invention and which is deployed within the vehicle of FIG. 1.

Referring now to FIGS. 1 and 3, there is shown a data acquisition and display assembly 10 which is made in accordance with the teachings of the preferred embodiment of the invention. As shown, the system 10 includes a camera or image acquisition assembly 15; a vehicle control assembly 20; an image control assembly 25; a voice activated control assembly 30; a video memory assembly 35; an audio assembly 40; a display assembly 45; and a lens cleaning assembly 50 which are each physically, operatively, and communicatively coupled to a "real time" video processing assembly or controller 55 which operates under stored program control. The functionality of each of these portions 15–55 of assembly 10 is more fully and completely delineated below.

As shown best in FIG. 1, camera assembly 15 includes several image acquisition devices or cameras 75 (i.e., such as and without limitation, six cameras) which are each substantially identical and which are each adapted to be selectively and removably mounted upon the roof 76 of vehicle 60 and to be "aesthetically integrated" into the "roofline" of the vehicle 60. That is, in the preferred embodiment of the invention, cameras 75 are selectively and equidistantly disposed along at least two edges 78 or the entire perimeter 78 of the roof 76, and have an image acquisition surface or portion 79 which is substantially coplanar to the roof surface portion 81 upon and/or within which they are respectively deployed. It should be appreciated that the substantially coplanar placement of cameras 75 upon roof surface portion 81 substantially protects cameras 75 from damage which may be caused by passing objects and/or other objects and/or debris which may come in close proximity to the vehicle. It should be appreciated that cameras 75 may alternatively be operatively mounted and/or placed upon other portions of the vehicle 60 (e.g., upon the doors).

Cameras 75 cooperatively acquire and provide image data of the environment or the ambient environment 83 that vehicle 60 resides within (i.e., image data of the areas and/or regions and/or objects which cooperatively surround and/or reside within the environment or ambient environment 83 of the vehicle 60). That is, each camera 75 has an operational field of vision or "view" which is generally indicated by arrows 80 and which respectively defines the portions, areas, and/or regions/volumes of the environment or the ambient environment 83 from which each of the respective cameras 75 may operatively and selectively acquire image data. In the preferred embodiment of the invention, the field of views 80 cooperatively surround the vehicle 60.

Figure 4:
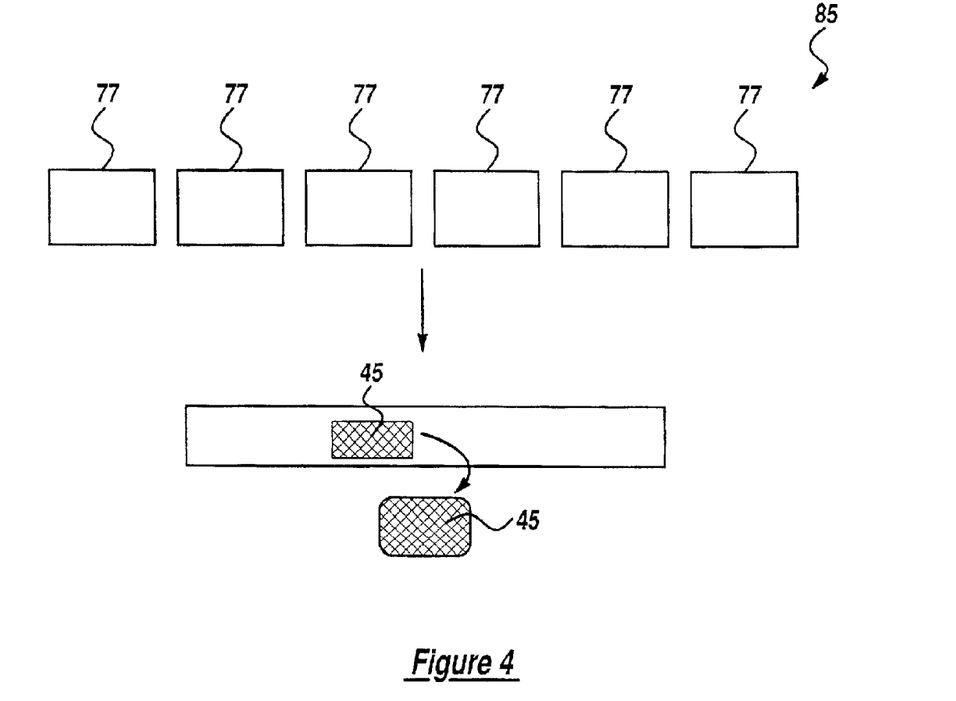
FIG. 4 is an operational diagram illustrating the creation of a mosaic image by the data acquisition and display assembly which is made in accordance with the teachings of the preferred embodiment of the invention.

As shown best in FIG. 4, the cameras 75 cooperatively and respectively acquire and provide images 77 from substantially unique areas and/or regions which are included within and/or which form the environment or the ambient environment 83. Particularly, each respective image 77 represents a different portion or volume of the ambient environment 83. In one non-limiting embodiment of the invention, each field of view 180 of each camera 75 abuts the respective fields of view 80 provided by the two spatially adjacent cameras 75 (i.e., abuts the respective field of view 80 provided by the cameras on each opposed side of the camera 75). In another non-limiting embodiment, each field of view 80 slightly overlaps the fields of view 80 of each of the respectively adjacent cameras 75 (i.e., a portion of the provided image of a camera 75 is similar to a portion of the image respectively provided by cameras which are adjacent to and which reside on opposite sides of the camera 75). In this manner, the acquired images 77 cooperatively form a panoramic view of the vehicle environment 83 at the instant of time in which the images 77 are acquired. The image data is stored in memory assembly 35 in a manner set forth below. In one non-limiting embodiment, these images are "updated" (i.e., newly acquired image data "replaces" the respectively and previously acquired respective image data) at programmed and/or regular intervals of time (i.e., the newly acquired data is "written over" the previously acquired data within memory 35).

In one non-limiting embodiment of the present invention, the cameras 75 comprise such conventional and commercially available cameras, such as a "fixed focus" and/or "fixed magnification" type. In a further non-limiting embodiment of the invention, cameras 75 may also comprise conventional "sub-miniature" "CCD" or "CMOS" type video cameras. Furthermore, each of the cameras 75 may, in further non-limiting embodiments, alternatively comprise a conventional and commercially available "color" type, "visible light" type, "infrared", "low light", and/or "image intensifier" type cameras.

Cameras 75, in another alternative embodiment of the invention, may be selectively dissimilar. Particularly, each camera 75 may operate within a different and/or unique portion of the electromagnetic spectrum (e.g., a conventional and relatively expensive night vision camera may be operatively used to provide images of the portion of the ambient environment 83 located in the front of the vehicle 60, thereby improving the quality of the image data of the front of the vehicle which is provided to the driver during foggy or rainy weather, while relatively inexpensive cameras may be deployed on other portions of the vehicle 60). In yet another non-limiting embodiment, imaging wave radar or imaging laser radar type devices and/or assemblies may also be selectively employed to obtain desired image data during adverse weather conditions or to gain visual images associated with objects and/or regions located and/or residing at relatively far distances from vehicle 60.

Each camera 75 is communicatively coupled to a "real time" video processing assembly or controller 55 by use of such media as coaxial cable and/or optical fiber (not shown) and the acquired data and/or images are selectively communicated to the subsystem or assembly 55 by use of this communications media. In the preferred embodiment of the invention, assembly 55 causes certain portions of the acquired image data to be selectively displayed to the driver of vehicle occupants.

Vehicle data acquisition and display system 10 further includes a video memory subsystem 35 which selectively receives and records the acquired image data, thereby allowing controller 55 to create a mosaic 85. In one non-limiting embodiment, the video memory subsystem 35 comprises conventional random access memory as the storage medium. However, other conventional and/or commercially available memory devices may alternatively and selectively be used to store the acquired image/visual data including, but not limited to, optical disks, digital tape, and/or analog tape. Once the video memory 35 is "full", previously recorded image data 77 are automatically purged and/or "written over", thereby allowing the newly acquired or "updated" image data 77 to be stored within assembly 10.

As further shown in FIG. 4, each acquired image 77 (i.e., the data which respectively forms and/or constitutes and/or is associated with each acquired image 77) is communicated to the video processing assembly 55 and, in one non-limiting embodiment, the processing assembly 55 uses the known orientation and spatial relationship of each of the deployed cameras 75 to selectively create a mosaic or panoramic view 85 of the ambient environment 83. That is, the assembly 55 places each of the acquired images 77 in a certain unique position within the memory assembly 35 based upon the identity (i.e., spatial location upon the roof 76) of the cameras 75 which generated these respective images. By sequentially outputting the previously stored image data in a certain manner, such as and without limitation, by viewing or outputting the images from a first of the cameras 75 and then sequentially viewing or outputting the acquired images from the remaining cameras 75 in the order that they are positioned upon the vehicle 60 (i.e., in a clockwise fashion) or in some other desired sequence, a "sweep", view, or mosaic 85 of substantially the entire environment or ambient environment 83 may be obtained. Moreover, a portion of the stored image data may be selectively accessed and displayed, thereby allowing a user to selectively view only a desired singular portion of the ambient environment 83. Mosaic 85 therefore comprises and/or forms a substantially pictorial and/or visual and relatively seamless "panorama" of the ambient vehicular environment 83.

Figure 2:
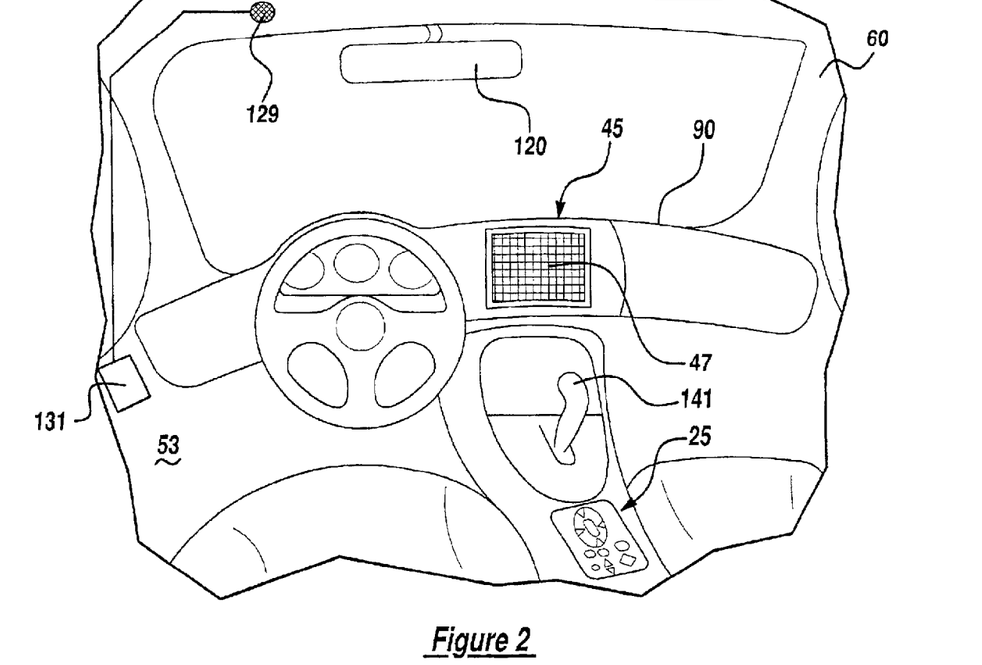
FIG. 2 is a perspective view of the dashboard portion of the vehicle which is shown in FIG. 1.

At least a portion of the created mosaic or seamless panorama 85 is displayed on and/or by the display assembly 45, which is shown in FIGS. 2 and 4. In one non-limiting embodiment of the present invention, the display assembly 45 comprises a single flat panel display device and/or apparatus 47 which, in one non-limiting embodiment, is selectively mounted near the center of the instrument panel or dashboard 90 of the vehicle 60. In a non-limiting embodiment of the invention, display assembly 45 comprises a "heads up" type display or other type of conventional and/or commercially available display system and/or assembly. In further non-limiting embodiments, the display assembly 45 may alternatively comprise a cathode ray tube; a head mounted display device; a virtual retinal display device; a projection display device; a holographic display device; a stereoscopic display device; an autostereoscopic display device; and/or a multiple video type display device.

Although the display assembly 45 is shown as an integral part of the dashboard 90 of the vehicle 60, other selective orientations or placements may be utilized. Particularly, as shown best in FIG. 6, the display system 45 may alternatively include a display device 47 (e.g., such as a flat panel type display) which "replaces" (e.g., provides substantially identical images as) a conventional rear view mirror 120 and two display devices 50, 52 which are selectively placed upon and/or within dashboard 90 and which respectively and selectively provide images of unique portions of the ambient environment 83 which are substantially and respectively similar to those images provided by conventional vehicle side mirrors (not shown). In this alternative embodiment, display 47 provides a substantially wide angle view of the area and/or region which is located and/or positioned behind the vehicle 60. Devices 50, 52 which may comprise flat panel type displays and selectively provide views or visual information of the areas and/or regions which are located and/or reside behind and along the respective opposite sides of the vehicle 60. The use of such displays 47, 50, 52 allows for sharper, clearer images to be provided over those respective images provided by conventional vehicle rear-view and side-view mirrors and further substantially prevents, as discussed later, deterioration of the provide images due to adverse weather. The use of devices 50, 52 within the passenger compartment 53 allows the images to be "closer" to the driver and within the driver's field of view, thereby reducing distraction and allowing the driver to quickly and efficiently view the presented images.

Figure 7:
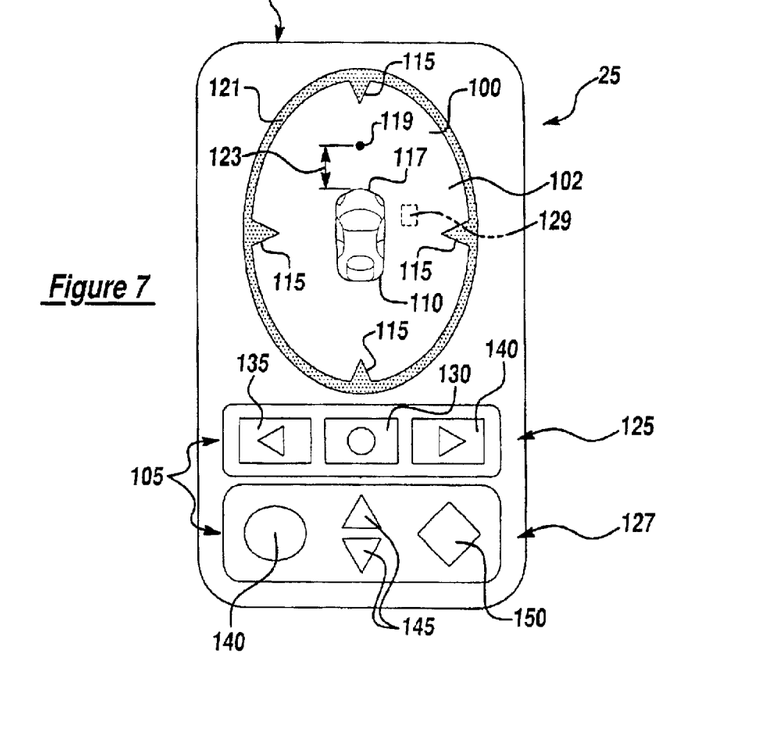
FIG. 7 is a top view of the image control portion of the assembly which is shown in FIG. 3.

The assembly 10, in another non-limiting embodiment, allows a user to adjust the view which is selectively displayed by the display assembly 45 through the use of >an image control assembly 25. In one non-limiting embodiment, as best shown in FIG. 7, the image control assembly 25 comprises a touch pad assembly 27 which selectively generates and communicates display control commands to the assembly 55 which, when received by the assembly 55, causes certain visual/image data to be presented to the user and/or occupants of the vehicle 60 by use of the display assembly and/or subsystem 45. Particularly, the touch pad assembly 27 comprises an "image choice" controller or touch pad panel member 100 and several selectively depressible switches 105. The touch pad assembly 27 further includes a pictorial representation or icon 110 of a vehicle, such as and without limitation vehicle 60, which is substantially positioned in the center of the touch pad panel 100 and several arrows or "quadrant markings" 115 which are positioned upon and which point toward the icon 110 from the periphery 121 of the touch pad panel 100. The markings 115 are substantially and equidistantly disposed around the pictorial representation 110. The touch pad panel 100 operatively resides upon a pressure sensitive electronic signaling device 102 which, in one non-limiting embodiment, is substantially similar to conventional signaling devices which are used within conventional remote controls used by and/or within conventional video game systems and which senses a touch or "press" of a portion of the panel 100 and, in response to such a sensed touch or press, generates and communicates a signal to controller 55.

In operation, when a user touches or presses the panel 100, the electronic signaler 102 produces and communicates a signal to the controller 55 by the use of a bus, cable, or other communication medium (not shown). When received, the generated signal is effective to cause the controller 55 to display a certain portion of the previously created or currently created panoramic view or mosaic 85 upon the display assembly 45. Hence, when a user and/or operator selectively touches the touch pad 100, the user may selectively cause certain of the previously acquired images or currently acquired images 77 to be displayed by the display assembly 45, thereby selectively viewing and/or acquiring visual information representing and/or associated with portions of the environment 83 in which the vehicle 60 resides.

For example, by touching the front portion 117 of the vehicular representation image icon 110, the previously acquired or currently acquired images of the area and/or region which is disposed and/or positioned in front of the vehicle 60 are selectively displayed upon display 45. By touching the touch pad 100 to the right or to the left of the schematic vehicle representation 110, previously acquired or currently acquired image data representing and/or associated with respective areas and/or regions which reside to the right of or the left of vehicle 60 are caused to be selectively displayed by the assembly 45. It should be appreciated that the touch pad 100 may be replaced by other conventional image controllers, including without limitation a conventional joystick, a track ball, or a collection of other types of selectively arranged switches. It should further be appreciated that images upon displays 47, 50, 52 may be unaltered by touch pad 110.

In another non-limiting embodiment of the invention, the touch pad 100 may also selectively provide "zoom in" and "pan out" functions. That is, in one non-limiting embodiment, the pad 100 (i.e., portion 102) detects the distance, proximity, or "how closely" a user is touching the pad 100 in relation to the schematic vehicle representation icon 110 and, based upon such detection, provides the previously acquired or currently acquired images of objects/regions/areas which are "correspondingly" close or far from vehicle 60. That is, if a user touches the pad 100 toward the top quadrant marking 115 which points directly at the front of the schematic vehicle 110, the display subsystem 45 will display "panned out" images or image information associated with objects and/or regions and/or areas which are relatively far away from the front of the vehicle 60 (i.e., objects/regions/areas which reside in the outer most portion of the field of view of that camera 75 which provides information of the front of the vehicle 60). However, should the user touch a point 119 on the touch pad 100 in relative close proximity to the representation 110, the assembly 45 will "zoom" in or selectively display objects and/or regions and/or areas in relative close proximity to the front 117 of the vehicle 60. That is, in one non-limiting embodiment, controller 55 will create a ratio having a numerator equal to the distance 123 from the icon 110 to point 119 and a denominator equal to the distance from the front of the icon 110 to the point 115. This ratio will then be used to select the portion of the previously acquired or currently acquired images which are to be selected by first identifying the camera 75 which has a field of view 80 which encompasses point 119 and then applying the ratio to the operating length of the field of view 80. The resultant length determines the "corresponding" portion of the field of view 80 or magnification which is required of the selected camera 75. The portion of the field of view 80 or the appropriate camera magnification will then be used to provide the desired images. Such a ratio may be used for other selectively touched points upon portion 100.

The touch pad assembly 27 further includes a replay switch assembly 125 and a menu switch assembly 127. In one non-limiting embodiment, the replay switch assembly 125 includes a "freeze" switch 130 and respective left or "rewind" and right or "forward" switches 135, 140. Each of these switches 130, 135, 140, in one non-limiting embodiment, are selectively depressible and when selectively depressed generate respective signals to the controller assembly 55 which, upon receipt of these signals, performs the functions/operations which are delineated below.

The switch 130, when selectively depressed, allows a user to "freeze" or stationarily position a particular portion of the panorama 85 on the display assembly 45. Once the image or view is "frozen", the user may then use the rewind switch 135 to selectively review previously displayed and stored image portions of the mosaic or panorama 85. The forward switch 140 allows the user to rapidly move "forward" or traverse through the previously acquired image panoramas and/or mosaics 85 which had previously be "rewound" or which have been previously stored within the memory 35. In one non-limiting embodiment, after completely rewinding or forwarding the selectively displayed panoramic images 85, the display subsystem 45 automatically "freezes" the portion of the panoramic images 85 being selectively displayed at the particular moment in which switch 130 was selectively and initially depressed before the "rewinding" or "forwarding occurred. The user may then selectively "zoom in" or "zoom out" of the displayed "frozen" portion of the panorama 85. That is, the user may also selectively touch the touch pad 100 and cause the then currently displayed image to change from that which represents the portion of the environment or ambient environment 83 which is in close proximity to vehicle 60 to that which represents the portion of the environment 83 which is relatively far from the vehicle 60. Alternatively, the distant images may be selectively replaced with close images or display assembly 45 may be caused to display images of other portions of the ambient environment 83 in the manner set forth above. The panorama or mosaic 85 may be acquired, created, and displayed in "real time" by depressing switch 130 a second time, thereby allowing and/or causing the mosaic 85 to be updated and displayed to the user by display assembly 45 at pre-determined intervals of time.

The image control assembly 25 also includes "menu" switches 127. In one embodiment, the first or left switch 140 activates a menu which may be selectively and alphanumerically displayed upon the touch pad 100. Switches 145 selectively allow the user to "scroll" through the presented menu items (i.e., by controlling an electronic pointer which is similar to that used by a computer mouse assembly), while switch 150 selectively allows one of the current or "highlighted" menu options or entries to be selected by a user (i.e., by selectively depressing switch 150 in a manner similar to the depression of a computer mouse switch). The menu switches 127 and the touch pad 100 may also be selectively illuminated by a selectively energizable source of light energy 129 in order to allow these switches 127 and the touch pad 100 to be used in a relatively dark environment.

Figure 6:
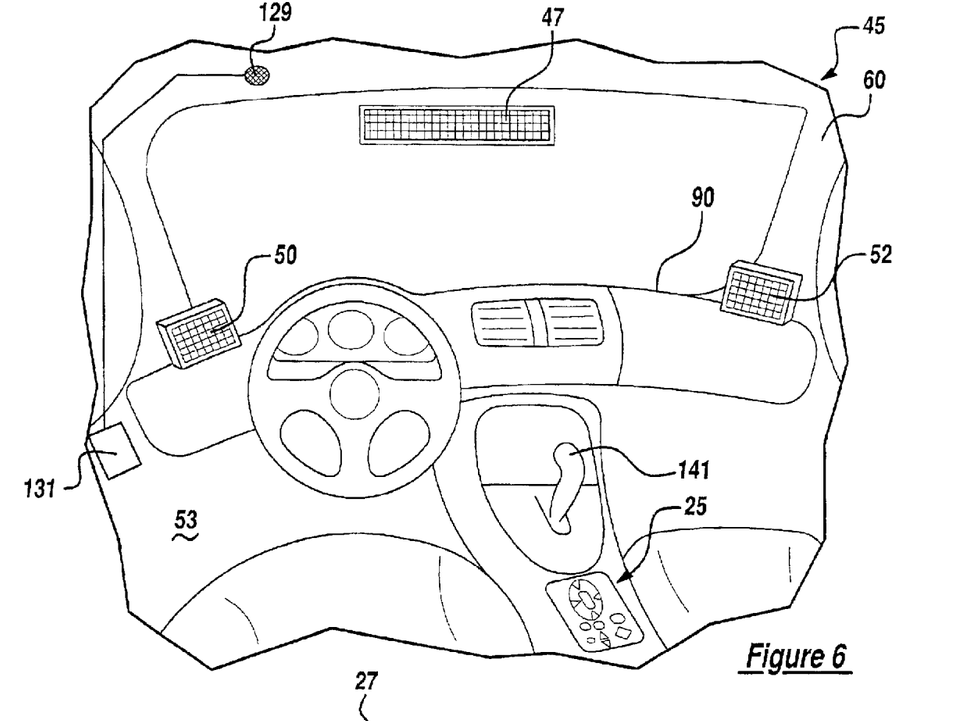
FIG. 6 is a perspective view of the dashboard portion of the vehicle which is shown in FIG. 1 and which incorporates an image acquisition and display assembly of an alternate embodiment of the invention.

Control of the display assembly 45 may also be accomplished by the use of a voice activated control assembly 30 which includes a conventional voice recognition interface 131. That is, as best shown in FIG. 6, at least one microphone 129 may be selectively placed within the passenger compartment 53 of vehicle 60 and be adapted to selectively receive sounds from inside of the vehicle 60 and to transmit these received sounds to the voice recognition interface or assembly 131 which is coupled to controller 55. In one non-limiting embodiment, assembly 131 is selectively programmed to create and transmit certain control signals to the processor assembly 55 in response to the receipt of certain audio information and/or received "sounds". For example, assembly 131 may be selectively and operatively programmed to send a "freeze" signal to the real time video processing subsystem 55 when the word "stop" is uttered or spoken inside the vehicle 60 by a user and/or operator.

Assembly 10 further includes a vehicle control assembly 15 which selectively monitors certain vehicle control attributes and/or functions and which selectively generates and communicates controls signals to the controller 55, effective to cooperatively control the operation of assembly 10 and the display of the previously acquired image upon display assembly 45. In response to a present sensed "state" or value of one or more of these vehicle control attributes (i.e., engine speed) and/or operations or maneuvers (i.e., placing the vehicle in "reverse"), the vehicle control subsystem 20 selectively generates and transmits signals to the controller 55 which are effective to cause the controller 55 to dynamically adjust and/or modify the displayed images 77 in a manner which allows the driver/operator of the vehicle 60 to gain relatively useful visual information.

For example and without limitation, when the vehicle control assembly 20 detects that the driver and/or operator of the vehicle 60 has operatively placed the vehicle shifting lever 141 into the "reverse" position, the vehicle control assembly 20 selectively generates and transmits a signal to the controller 55, effective to selectively cause controller 55 to cause the display of images, objects, regions, and/or areas residing behind the vehicle 60. In this manner, the vehicle driver and/or occupants are able and/or allowed to view the area and/or region which is behind the vehicle 60, thereby gaining visual information of this portion of the ambient environment 83 before the vehicle 60 is selectively moved to and/or within this area and/or region. In response to a sensed engine speed attribute, assembly 15 may automatically cause images from the camera 75 having a field of view 80 in the front of the vehicle 60 to be displayed upon display 45, thereby allowing the driver to gain images of the front of the vehicle 60.

Figure 5:
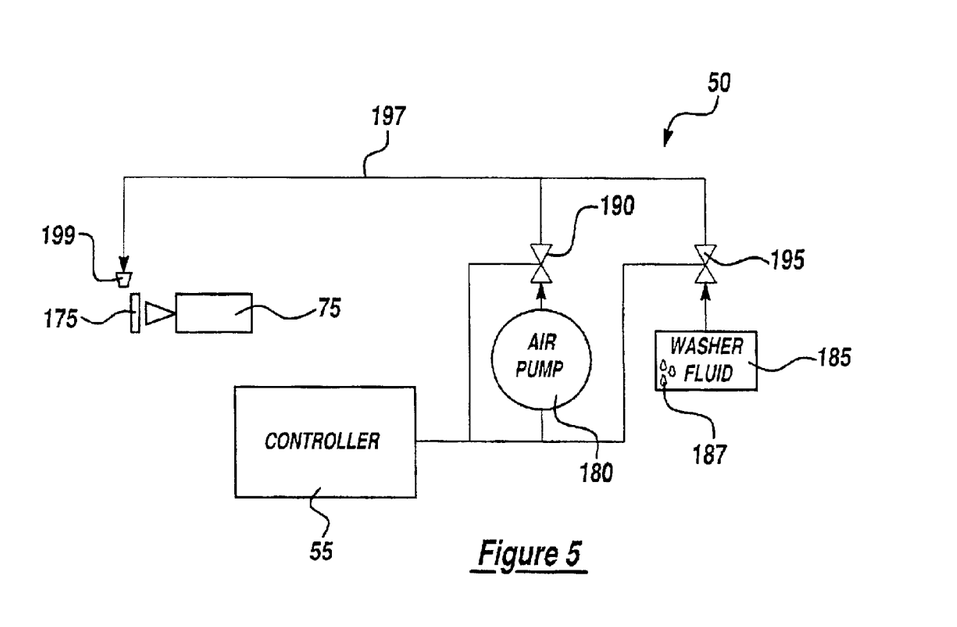
FIG. 5 is a block diagram of the lens cleaning assembly which is shown in FIG. 3.

As shown best in FIG. 5, assembly 10 further includes a lens cleaning assembly 50 which is selectively and operatively controlled by the controller 55. That is, should the acquired and/or displayed images, acquired by one or more of the cameras 75, become "unclear" or "hazy", the controller 55 selectively causes assembly 55 to selectively "clean" the protective lens covers 175 which are each respectively seated over a unique one of the lenses of the camera 75 (e.g., each camera 75 is selectively "protected" and/or "covered" by a unique one of the protective lens covers 175).

In one non-limiting embodiment, assembly 50 includes an air compressor or pump 180 which is disposed within the vehicle 60 and which selectively generates and releases compressed air. Assembly 50 further includes a container or reservoir 185 which is disposed within the vehicle 60 and which selectively contains a cleansing agent or fluid 187, and a pair of valves 190, 195 which are operatively and selectively coupled, by conduit and/or tube 197, to several nozzles 199 which are each respectively and selectively placed in relative close proximity to a unique one of the lens covers 175 and which are each respectively coupled to pump 180 and to container or reservoir 185. In operation, controller 55 selectively transmits a signal that operatively and selectively opens a first valve 190 while activating pump 180, thereby allowing the generated compressed air to be selectively "blown" or applied to nozzles 199 and to the lens covers 175. Controller 55 also selectively generates and transmits a second signal effective to open a second valve 195 which allows the cleansing agent 187 to be concomitantly and selectively "blown" or applied upon the lens covers 175 with the compressed air. Once the air and fluid 187 are concomitantly blown onto lenses 175, compressed air is again blown or applied to these covers 175 in order to relatively quickly "dry" the lens covers 175. In the same manner, assembly may also be used to substantially "de-ice" the lens covers 175. Further, in another non-limiting embodiment of the invention, the cleaning agent or liquid 187 (e.g., washer fluid) may be selectively heated using excess engine heat or some other conventional heating method, thereby further allowing assembly 55 to cause ice, which resides upon the lens cover 175, to be relatively quickly melted. The foregoing cleaning procedure may be initiated by receipt of a "cleaning" voice command received by the microphone 129 and assembly 131.

Vehicle data acquisition and display assembly 10 further includes an audio assembly 40 which selectively allows some of the previously acquired or currently acquired data or information (e.g., data representing ambient environment 83) to be selectively and audibly presented to the vehicle driver and/or user. For example and without limitation, assembly 40 selectively announces the presence of an object which is identified to be in close proximity to the vehicle 60 and which has an image contained within a portion of the mosaic 85. In a further non-limiting embodiment, assembly 40 identifies the portion or region of the panorama 85 which is selectively presented and displayed by display assembly 45.

It should be understood that this invention is not to be limited to the exact construction or embodiment described above but that various changes may be made without departing from the spirit or scope of the invention.

What is claimed is:

1. A vehicle data acquisition and display assembly comprising:
   at least two image acquisition apparatuses which are disposed upon a vehicle and which acquire images of the environment in which said vehicle resides;
   a video processing assembly which is coupled to said at least two image acquisition apparatuses, which receives said acquired images, and which uses said acquired images to create a mosaic image of said environment;
   a display which is coupled to said video processing assembly, which is disposed within said vehicle, and which selectively displays at least one portion of said mosaic; and
   an image control assembly which selects said at least one portion, thereby allowing said at least one portion of said mosaic to be selectively displayed by said display assembly;
   wherein said vehicle has at least one attribute and wherein said assembly selectively monitors said at least one attribute and, in response to said monitored attribute, generates a certain signal which is effective to cause a second portion of said mosaic to be displayed by said display assembly.

2. The vehicle data acquisition and display assembly of claim 1 wherein said at least two image acquisition apparatuses each comprise a camera.

3. The vehicle data acquisition and display assembly of claim 1 wherein said vehicle is selectively maneuvered and wherein said assembly senses said maneuvering of said vehicle and, in response to said sensed maneuvering, causes a third portion of said mosaic to be displayed by said display assembly.

4. The vehicle acquisition and display assembly of claim 3 further comprising a voice activated control assembly which selectively receives at least one voice command and which selectively causes a fourth portion of said mosaic to be displayed in response to said at least one voice command.

5. The vehicle data acquisition and display assembly of claim 1 further comprising:
   at lease one lens cover; and
   a lens cleaning assembly which selectively cleans said at least one lens cover.

6. The vehicle data acquisition and display assembly of claim 5 wherein said lens cleaning assembly includes a source of compressed air; and a valve which selectively allows said compressed air to be applied to said at least one lens cover.

7. The vehicle data acquisition and display assembly of claim 6 wherein said lens cleaning assembly further includes a source of a cleansing agent which is selectively and concomitantly mixed with said applied compressed air.

8. The vehicle data acquisition and display assembly of claim 7 wherein said cleansing agent is warmed before it is mixed with said applied compressed air.

9. The vehicle data acquisition and display assembly of claim 1 further comprising an audio assembly which selectively generates certain audio signals which describe said at least one portion of said mosaic.

10. An assembly for use with a vehicle of the type having a roof, said assembly comprising:
    a plurality of cameras which are equidistantly disposed along at least two edges of said roof and which cooperatively provide images of the environment in which said vehicle resides, wherein said equidistant spacing of said cameras is effective to cause each provided image from two spatially adjacent cameras to abut to cooperatively form a panoramic mosaic view;

a display assembly which selectively displays said mosaic view of said cooperatively provided images; and a controller having a touch sensitive surface upon which an icon is disposed, said controller selecting a first portion of said cooperatively provided images by use of said touch sensitive surface and causing said selected first portion of said cooperatively provided images to be displayed by said display assembly;

wherein said vehicle has at least one attribute and wherein said controller selectively monitors said at least one attribute and, in response to said monitored attribute, displays a second portion of said images on said display assembly.

11. The assembly of claim 10 wherein each of said cameras have an image acquisition surface which is substantially coplanar with a portion of said roof.

12. The assembly of claim 11 wherein said cooperatively provided images include a first image which represents a first portion of the environment which is relatively far from said vehicle and a second image which represents a second portion of said environment which is relatively close to said vehicle, said controller selecting said first image to be displayed upon said display assembly when said controller is touched at a point which is relatively far from said icon and selecting said second image to be displayed upon said display assembly when said controller is touched at a second point which is relatively close to said icon.

13. The assembly of claim 12 wherein said icon comprises an image of a vehicle.

14. The assembly of claim 13 further comprising an audio generator which selectively generates certain sounds which are based upon said certain portion of said cooperatively provided images.

15. The assembly of claim 9 further comprising a voice recognition module which causes said first portion of said cooperatively provided images to be displayed by said display assembly in response to a receipt of a certain voice command.

16. A method for acquiring and selectively displaying images to be viewed within a vehicle, said method comprising the steps of:

providing a plurality of cameras;

disposing said plurality of cameras upon said vehicle, effective to acquire said images;

providing a display;

disposing said display within said vehicle, effective to selectively display a seamless mosaic view from at least a portion of said images;

generating a voice command; and using said voice command to select at least a portion of said images.

17. The method of claim 16 further comprising the steps of:

providing a source of air;

disposing said source of air within said vehicle;

generating a second voice command; and causing said air to be applied to at least one of said plurality of cameras by use of said generated second voice command.

18. The method of claim 17 further comprising the steps of:

providing a cleansing agent;

heating said cleansing agent;

mixing said air with said headed cleansing agent; and applying said mixture of said air and said heated cleaning agent to said at least one of said plurality of cameras.

19. The method of claim 16 wherein each of said cameras are substantially identical.

* * * * *